United States Patent [19]

Kauffman, Jr. et al.

[11] Patent Number: 4,763,251

[45] Date of Patent: Aug. 9, 1988

[54] MERGE AND COPY BIT BLOCK TRANSFER IMPLEMENTATION

[75] Inventors: Arthur A. Kauffman, Jr.; John S. Muhich, both of Austin, Tex.

[73] Assignee: International Business Machines Corporation, Armonk, N.Y.

[21] Appl. No.: 820,466

[22] Filed: Jan. 17, 1986

[51] Int. Cl.⁴ ............................................. G06F 12/02
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 3,973,245 | 8/1976 | Belser | 364/200 |
| 4,090,174 | 5/1978 | Van Voorhis | 340/146.3 |
| 4,296,476 | 10/1981 | Mayer et al. | 364/900 |
| 4,460,958 | 7/1984 | Christopher et al. | 364/200 |
| 4,481,578 | 11/1984 | Hughes et al. | 364/200 |
| 4,495,567 | 1/1985 | Treen | 364/200 |
| 4,667,308 | 5/1987 | Hayes et al. | 364/900 |

*Primary Examiner*—Thomas M. Heckler
*Attorney, Agent, or Firm*—Thomas E. Tyson

[57] ABSTRACT

A memory circuit including a bit addressable binary data memory in which the data is stored in a plurality of dimensional directions and a circuit for accessing a group of the data in the memory in at least two of the dimensional directions and for moving the data to a different dimensional location while maintaining the data within the group. Also provided is a means for accessing the data by incrementally or decrementally addressing the data in at least one of the directions. The accessing circuitry is further used to perform bit block transfers of data within the memory. The accessing circuit also provides for horizontal or vertical access during a read operation while orthogonally rotating the data by 90 degrees during a following write operation.

15 Claims, 8 Drawing Sheets

| INPUT TO MASK GENERATOR (BINARY) | OUTPUT OF MASK GENERATOR (BINARY) | FUNCTION TO BE PERFORMED |
|---|---|---|
| 0000000000 | 1000000000000000 | WRITE FIRST BIT ONLY |
| 0000000001 | 1100000000000000 | WRITE FIRST 2 BITS ONLY |
| 0000000010 | 1110000000000000 | WRITE FIRST 3 BITS ONLY |
| 0000000011 | 1111000000000000 | WRITE FIRST 4 BITS ONLY |
| 0000000100 | 1111100000000000 | WRITE FIRST 5 BITS ONLY |
| ... | ... | ... |
| 0000001101 | 1111111111111100 | WRITE FIRST 14 BITS ONLY |
| 0000001110 | 1111111111111110 | WRITE FIRST 15 BITS ONLY |
| 0000001111 | 1111111111111111 | WRITE FIRST 16 BITS |
| 0000010000 | 1111111111111111 | WRITE FIRST 16 BITS |
| 0000010001 | 1111111111111111 | WRITE FIRST 16 BITS |
| ... | ... | ... |
| 1111111110 | 1111111111111111 | WRITE FIRST 16 BITS |
| 1111111111 | 1111111111111111 | WRITE FIRST 16 BITS |

TABLE I.

FIG. 11

| SOURCE DIRECTION OF ACCESS | DESTINATION DIRECTION OF ACCESS | SOURCE OUTER LOOP | DESTINATION OUTER LOOP | FIGURE REFERENCE |
|---|---|---|---|---|
| HORIZONTAL | HORIZONTAL | INC | INC | 3. |
| VERTICAL | VERTICAL | INC | INC | 5. |
| HORIZONTAL | HORIZONTAL | DEC | DEC | 4. |
| VERTICAL | VERTICAL | DEC | DEC | 6. |
| HORIZONTAL | VERTICAL | INC | DEC | 7. |
| VERTICAL | HORIZONTAL | INC | DEC | 8. |
| HORIZONTAL | HORIZONTAL | INC | DEC | 9. |
| VERTICAL | VERTICAL | INC | DEC | 10. |

TABLE II.

MERGE AND COPY BIT BLOCK TRANSFER IMPLEMENTATION

TECHNICAL FIELD

This invention relates to video display systems and more specifically to a video display system providing memory Bit Block Transfer capability.

BACKGROUND ART

Bit mapped displays treat the display screen as a discrete rectangular mesh or matrix of dots. These dots are referred to as pels or pixels (picture elements), and each pel is represented by one or more bits in the display's memory array. A very useful function for bit mapped displays is the ability to move a rectangular block of pels from one place in the bit map to another place and logically combine the source rectangle with the destination rectangle. These logical functions include AND, OR, EXCLUSIVE OR, REPLACE, etc. This function can be accomplished without any assistance from the hardware, but this is costly in code space and execution time.

Bit addressability is the ability to start reading or writing a series of pel data at any particular pel or pixel location in memory. This ability was limited to a horizontal series of pels because of the traditional layout and control of the bit map's memory, but it did help relieve some of the burden from software.

An example of an image processing memory is disclosed in U.S. Pat. No. 4,090,174 entitled "Method and Apparatus for accessing Horizontal Sequences, Vertical Sequences and Rectangular Subarrays from an Array Stored in a Modified Word Organized Random Access Memory System" assigned to the present assignee.

DISCLOSURE OF THE INVENTION

In accordance with the present invention, a memory circuit is provided that includes a storing circuit for storing bit addressable binary data in a plurality of dimensional directions. Accessing circuitry is also provided for accessing a group of the binary data in the storing circuit in at least two of the dimensional directions and moving the data to a different dimensional location while maintaining the data within the group.

Also, in accordance with the present invention, a memory circuit is provided that includes a storing circuit for storing bit addressable binary data in a plurality of dimensional directions wherein the directions are orthogonal and an accessing circuit for accessing the data in the storing circuit by incrementally or decrementally addressing the data in at least one of the directions.

In the preferred embodiment, the memory is a bit addressable multi-dimensional array memory that includes a micro-processor and special circuitry to perform bit block transfers by accessing data using special circuitry that automatically decrements or increments the addresses. The circuitry further includes special latches that allow the direction of access to be changed from a horizontal dimensional direction to a vertical dimensional direction and to further change the direction between a read operation and a write operation during transfer. Other circuitry is provided that allows access to a variable number of bits during a single access cycle and also the capability to perform logical operations on data in the memory.

BRIEF DESCRIPTION OF DRAWING

FIG. 11 is a table illustrating the operation of a mask generator; and

FIG. 12 is a table listing the combination of directions of access for the invention.

BEST MODE FOR CARRYING OUT THE INVENTION

Figure 1:
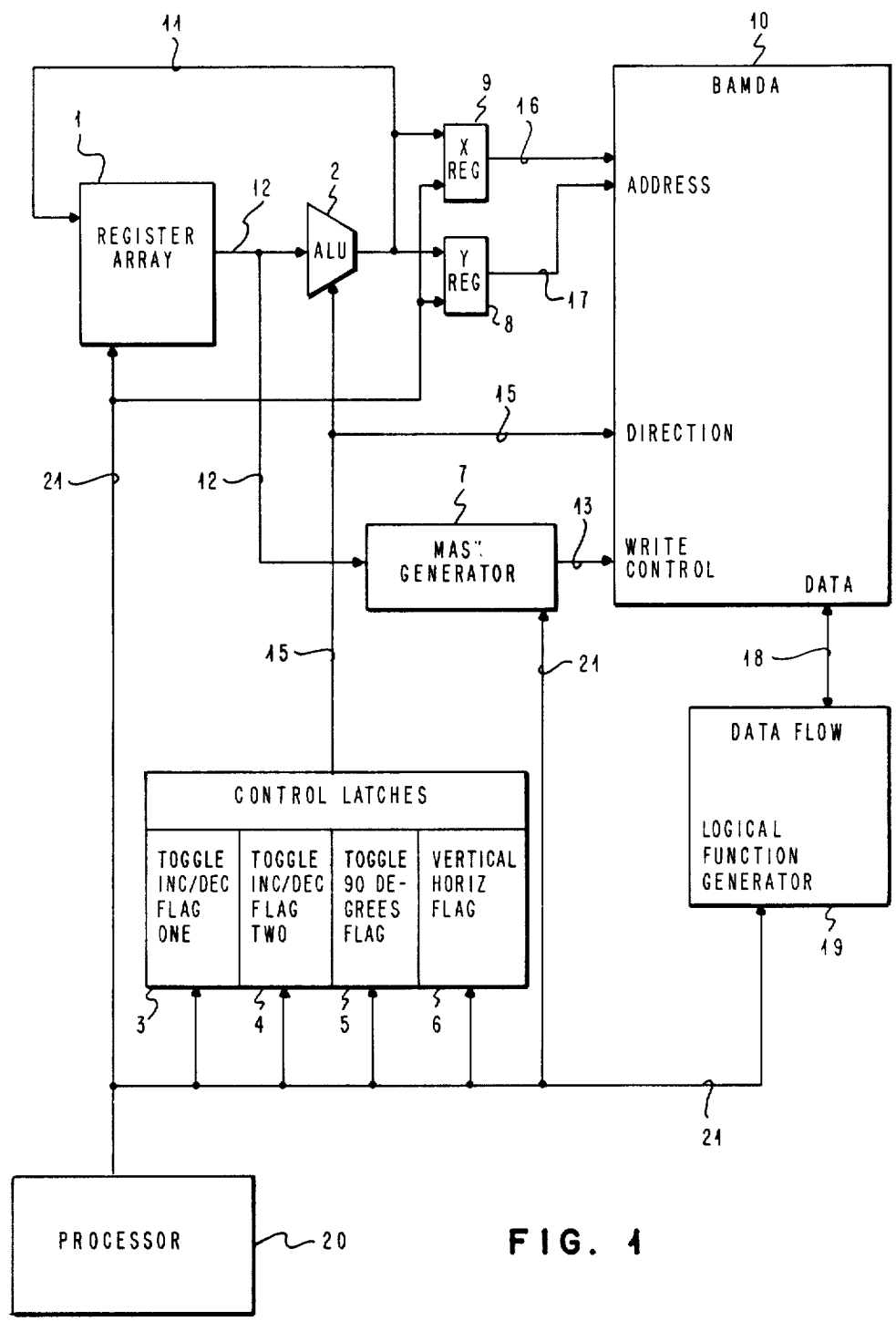
FIG. 1 is a block diagram of the microcoded processor.

In accordance with the present invention, a system to perform Bit Block Transfers within the display memory map is provided. This invention includes a processor and circuitry together with microcode to provide a large set of Bit Block Transfer functions featuring efficient execution speed and extreme compactness of code space.

The microcoded processor will be referred to as a rasterop engine. A raster is a rectangle of discrete elements such as picture elements or dots on a screen. The rasterop engine is a processor that performs operations upon rasters. In this case the rasters are rectangular sections consisting of picture elements (pixels or pels).

The unique circuitry allows inner and outer loops of the Bit Block Transfer code to be written providing one set of functions; but, when properly enabled by different setup code, this same code provides very different capabilities. By using various combinations of these hardware features, a large set of very useful functions is performed. The inner loop is defined as steps 42, 44, 46, 48, 50, and 52 in FIG. 2b. The outer loop is defined as steps 40, 54, 56, 58, and 60 in FIG. 2b.

These hardware features include bit addressability in a vertical as well as horizontal direction (See U.S. patent application Ser. No. 701,328 Filed Feb. 13, 1985 and herin incorporated by reference and referred to as BAMDA or bit addressable multi-dimensional array). This memory allows reading of sixteen bits and writing of up to sixteen bits on any bit boundary and the direction of writing can take place in either the horizontal or vertical direction. This eliminates the initial edge condition normally found in bit mapped displays that do not have bit addressability. Without bit addressability, the source and destination addresses may not have the same alignment with respect to byte or word boundaries. The initial edge condition may require two read accesses of the source data plus shifting and masking in order to form the first write to the destination address. Bit addressability makes the code space smaller and shortens the execution time required to do a Bit Block Transfer function.

Also included is a logical function generator to allow the combining of source and destination data. This works equally well regardless of the direction of access for the source data or for the direction of access of the destination data.

Further mask generation hardware is included that forms a write mask based on the contents of the inner loop count of the Bit Block Transfer code. The initial edge problem was solved by the bit addressability. Reading and writing the bit map continues with slices of sixteen bits until the inner loop count falls below sixteen. Traditionally a routine would have to branch to external code to execute a partial write at the end of the inner loop. This external code would compute and construct the proper write mask for the partial write. In this invention this is not necessary because the write mask is always generated automatically by the circuitry from the inner loop count of the Bit Block Transfer code resulting in a savings of code space and execution time.

Toggle Inc/Dec (increment and decrement) circuitry is included that alters the source and destination addresses. This Toggle Inc/Dec circuitry allows a loop to be written with multiple functions. At execution time the Toggle Inc/Dec circuitry can be enabled to perform the opposite function. If enabled, the increment instruction would execute as a decrement or vice versa. This allows the coder to make one loop do different functions simply by using a different setup routine. This results in a great saving of code space.

Set Vertical circuitry is provided which changes the bit map access from the default (horizontal direction) to the vertical direction. This allows flexibility in creating setup routines which make the same loop perform different functions.

Toggle 90 Degrees circuitry is provided which, when enabled, changes the direction of access from horizontal to vertical or from vertical to horizontal. This allows the same loop to perform different functions depending on whether the Toggle 90 Degrees function is enabled.

The following description shows how eight different Bit Block Transfer functions are performed by the same inner and outer loop of code. This results from different microcoded setup routines which invoke, in various combinations, the special hardware circuitry described above.

This invention relates to the movement of a rectangle of pels from a source location to a destination location. This implementation uses a unique combination of hardware circuitry to accomplish a large set of Bit Block Transfer functions. It should be noted that the origin of the screen on this display system is in the upper left corner. The x-address increases in the positive direction to the right and the y-address increases in the positive direction toward the bottom of the screen.

FIG. 1 is a block diagram of the rasterop engine and its bit map memory. The processor 20 fetches horizontally microcoded instructions which can control various components of the hardware. The processor affects and controls the functions of the register array 1, the X register 9, the Y register 8, the toggle inc/dec flags 3 and 4, the toggle 90 degrees flag 5, the vertical/horizontal flag 6, the mask generator hardware 7, and the logical function generator 19. The processor controls all of these functions on line 21. The processor controls the arithmetic logic unit 2 through line 21, the control flags 3, 4, 5, and 6, and line 15. The Bit Addressable Multidimensional Access memory (BAMDA) 10 provides the memory for the bit map and this is where the source and destination data reside. BAMDA refers to U.S. patent application Ser. No. 701,328 filed Feb. 13, 1985 and herein incorporated by reference. X register 9 and Y register 8 provide the address over lines 16 and 17 to the memory 10. These addresses come from the register array 1 through the ALU (arithmetic logic unit) 2 on line 12. The addresses can be returned to the register array 1 as well as sent to either the X register 9 or Y register 8 memory addresses on line 11. The direction of access (horizontal or vertical) to the memory 10 is controlled by a combination of the Toggle 90 Degrees flag 5 and the Vertical/Horizontal flag 6 on line 15. When writing data to the memory 10, the Toggle 90 Degrees flag 5 and the Vertical/Horizontal flag 6 specify the direction of access through line 15. To create the write mask, the inner loop count in register array 1 is sent on line 12 to the mask generator 7 which is combinatorial logic to be discussed. The mask generator 7 outputs to the write control logic of the memory 10 on line 13. The source data is combined with the destination data by the logical function generator 19 (which is combinatorial logic to be discussed) on line 18. The outer loop variables in the register array 1 are sent to the ALU 2 on line 12 and are incremented or decremented by the toggle inc/dec function flags 3 and 4. These control flags are sent to the ALU 2 on line 15.

Mask generator 7 includes a network of combinatorial logic that performs as illustrated in Table I(11). This table shows how the ten bits of inner loop count from the register array 1 are converted by this combinatorial logic 7 into the write mask. The same number of bits are always read from the bit map memory 10, but sometimes it is desired to load fewer bits in the bit map memory. The write mask allows selective writing of any number of bits such as zero to sixteen in the preferred embodiment. In Table I the second column labeled, "Output of the Mask Generator" shows the resultant write mask given the inner loop count in the first column. The binary ones in the write mask indicate that the corresponding bit will be updated. A binary zero indicates that the corresponding bit in the bit map memory will not be updated. The bit addressability of the bit map memory 10 in both vertical and horizontal directions means that the left most bit of the write mask will affect the bit indicated by the ten bit Y-address in the Y register 8 and the ten bit X-address in the X register 9. The other bits in the series of bits to be written are in the positive direction. If the access direction is horizontal then they are written in the positive direction (to the right) relative to the leftmost bit of the write mask. If the access direction is vertical then they are written in the positive direction (down) relative to the leftmost bit of the write mask. The write mask generator 7 creates a write mask from the inner loop count in register array 1. The initial value for the inner loop count is the number of pels to be written minus one. This will be explained in more detail below along with a detailed explanation of the flowchart in FIGS. 2a and 2b. The reason the mask generator 7 uses the number of pels to be written minus one is because of the conditional branch logic of the microcode. It is desirable to detect when the inner loop was completed at the same time as subtracting off the number of pels read. The only convenient condition is when the inner loop count is less than zero (negative). The decision to generate the write mask from the number of pels minus one rather than the number of pels provides greater efficiency since the conditional branches were not be enhanced due to implementation contraints.

The logical function generator 19 in FIG. 1 performs logical operations on data input to the bit map memory 10 and is such as a Texas Instruments part number 74181 or other off the shelf items of similar function.

Figure 2A:
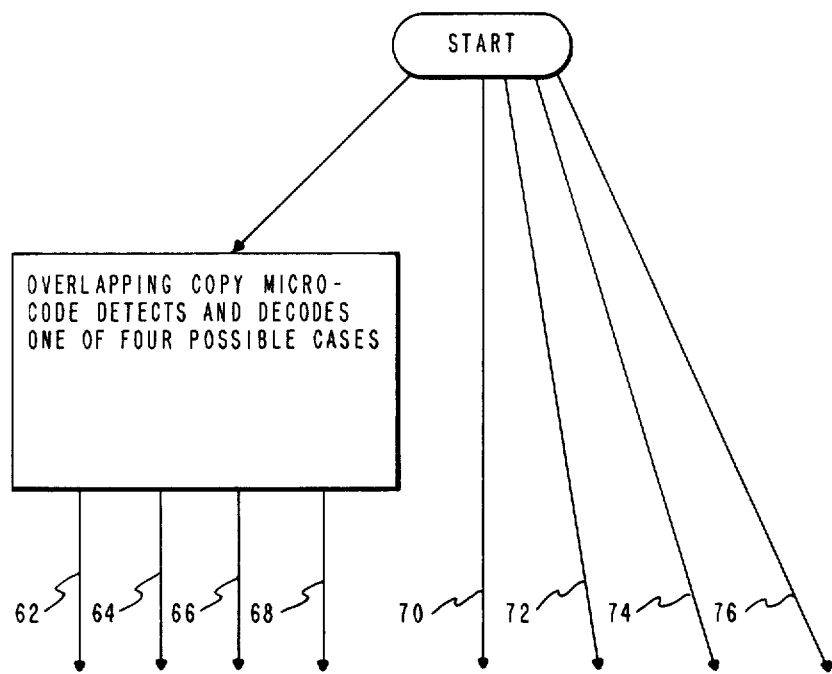
FIGS. 2a and 2b are a flowchart of the steps taken by the processor to perform the function described herein.
Figure 2B:
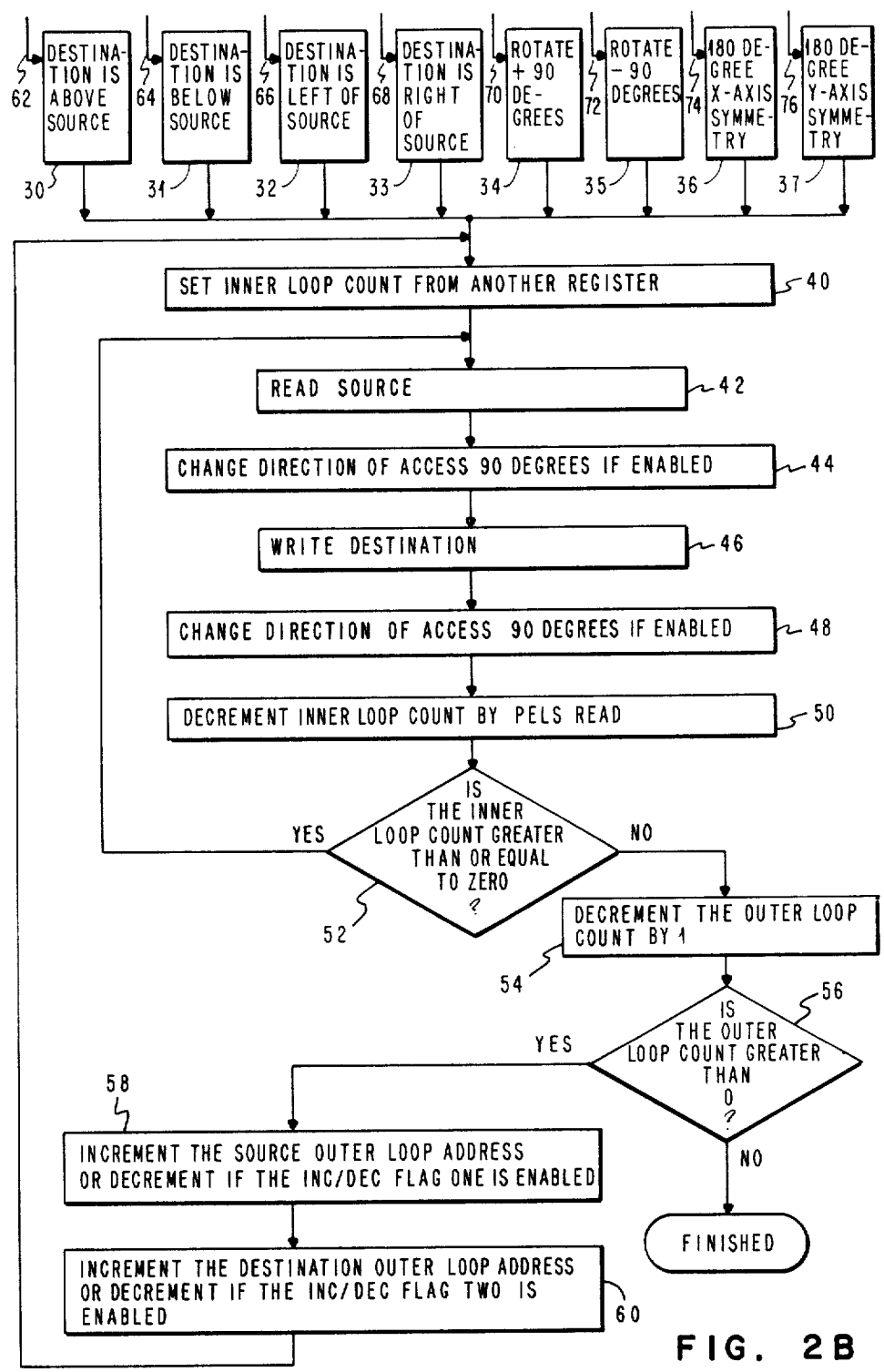
Figure 3:
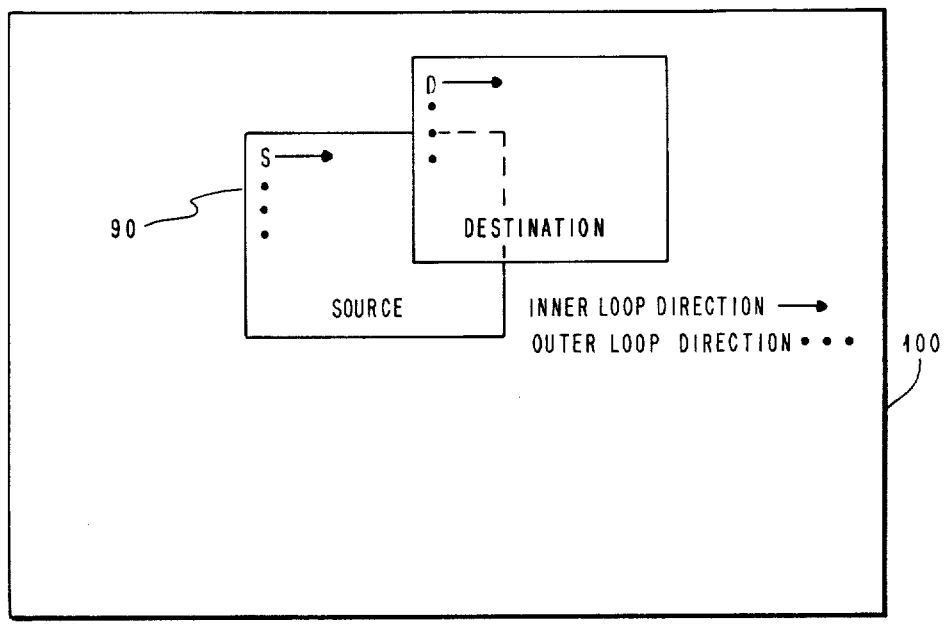
FIGS. 3 illustrates the Merge or Copy Bit Block Transfer where the destination is physically above the source rectangle.

FIGS. 2a and 2b is a flow chart showing the 8 different setup routines 30, 31, 32, 33, 34, 35, 36, 37 that feed into the inner and outer loops. The inner loop consists of the instructions 42, 44, 46, 48, 50 and 52. The outer loop consists of the instructions 40, 54, 56, 58, and 60. The path into the inner and outer loop of FIG. 2b starts with one of five specified operations. If the operation is a copy function as shown in FIGS. 3 through 6, then the microcode detects which of the four cases applies to this particular copy operation. The appropriate setup code 30, 31, 32, or 33 is selected and branched to as shown in FIGS. 2a and 2b on the corresponding lines 62, 64, 66, 68. The other four copy functions are specified directly and the appropriate setup code 34, 35, 36, or 37 is branched to as shown by the corresponding lines 70, 72, 74, 76. The eight microcode functions that input into the same inner loop 30, 31, 32, 33, 34, 35, 36, and 37 use different combinations of the two toggle inc/dec flags 3 and 4 in FIG. 1, the toggle 90 degrees flag 5 and the vertical/horizontal flag 6. The combinations of these control flags allows a single inner and outer loop of microcode to perform eight different functions. The flow chart will be discussed in detail for the default case where the source and destination rectangles may overlap with the destination rectangle physically above the source rectangle as illustrated in FIG. 3.

FIGS. 3 through 10 show how these hardware features are combined to form the eight Bit Block Transfer functions of this invention on a display 100. FIGS. 3 through 6 illustrate the cases in which the Bit Block Transfer is a merge or copy and the source and destination rectangles may overlap. Merge or Copy operations of this sort do not rotate the data as the data is being transferred. The source is read in the same orientation (horizontal or vertical) as the destination is written.

FIG. 3 illustrates the case where the destination rectangle is physically above the source rectangle. This may be considered the default case with all other seven cases being variations of this. Note that the amount of horizontal displacement between source and destination need not be considered. The access of the bit map is horizontal for both the source and destination rectangles and the outer loop increments both the source and destination y-addresses. The inner loop reads the source and writes the destination from left to right in horizontal mode until the inner loop is exhausted. To scan out the next part of the rectangle, the outer loop, for both the source and destination addresses, increments the y-address. The inner loop count is replenished from the register array 1 in FIG. 1 and again another piece of the rectangle is scanned out left to right.

The example illustrated in FIG. 3 will be used to explain the flow chart in FIGS. 2a and 2b. This is the case where the destination rectangle is above the source rectangle. This corresponds to 30 in FIG. 2. This setup code does not set any of the control flags. It does not set either of the two toggle inc/dec flags 3 or 4, or the toggle 90 degrees flag 5, or the vertical/horizontal flag 6. The outer loop step 40 loads the inner loop count from a register that holds a copy of the inner loop count. Both registers are found in the register array 1 in FIG. 1. In the case of FIG. 3 the inner loop count is the number of pels in the horizontal direction minus one, or in other words the width of the rectangle minus one.

Step 42 begins the inner loop. This step reads the source rectangle's data. Since the vertical/horizontal flag 6 was not changed from the default (horizontal) direction by the setup code 30, the source is accessed in the horizontal direction. Step 44 has no action since the toggle 90 degrees flag 5 has not been set. If the toggle 90 degrees flag had been set then the direction of memory access would have changed from horizontal to vertical or vice versa. The data read in step 42 is written to the memory 10 by step 46. Since step 44 did not change the direction of memory access and since the initial direction of access from the setup code 30 was horizontal, the data is written to the memory 10 in the horizontal direction. Step 48 has no effect since the setup code did not enable (set) the toggle 90 degrees flag 5. Step 50 decrements the inner loop count by the number of pels read during one memory access. Step 52 tests whether or not the inner loop count has been exhausted. If there are more pels to complete the width of the rectangle in FIG. 3, then a branch takes place back to step 42 and the inner loop process is continued. If the inner loop count has been exhausted, then control is trasferred to step 54 which decrements the outer loop count by 1. Note that if the last write is a partial write (less than sixteen bits) the correct write mask will be correctly mask generated. This is because the inner loop count in register array 1 is always sent to mask generator 7 on line 12. If the inner loop count is fifteen or greater, then the number of bits written is sixteen; but if the inner loop count is less than fifteen, the number of bits written equals the inner loop count plus one.

Once the inner loop count is exhausted control goes to step 54. This step decrements the outer loop count by one. The outer loop count is the number of pels that make up the side of the rectangle that is orthogonal to the side scanned out by the inner loop. In FIG. 3 this is the vertical side 90 or in other words the height of the rectangle. Step 56 tests whether the outer loop count has been exhausted. If it has, then the Bit Block Transfer is finished. Otherwise there is more to do and control is transferred to step 58. Step 58 is coded so that it will increment the source rectangle's outer loop address in the default case. If the toggle inc/dec flag one 3 has been set by the setup code, this will execute as a decrement of the source rectangle's outer loop address. For FIG. 3 the setup code 30 did not set any toggle inc/dec flags and step 58 will execute as an increment. Step 60 is similar in purpose to step 58, but step 60 operates on the destination outer loop address. Step 60 will increment the destination outer loop address unless the toggle inc/dec flag 4 in FIG. 1 has been set by the setup code. If the setup code had set (enabled) the toggle inc/dec flag number two 4 in FIG. 1, then this instruction would decrement the destination outer loop address. Since the setup code 30 did not set the toggle inc/dec flag number two 4, step 60 increments the destination outer loop address. Control branches to step 40 which restores the previously exhausted inner loop count and the inner loop continues as described above.

Summarizing FIG. 3, the inner loop accesses the source rectangle in the horizontal direction and increments the source rectangle's x-address. The inner loop accesses the destination rectangle in the horizontal direction and increments the destination rectangle's x-address. The outer loop increments the source rectangle's y-address and increments the destination rectangle's y-address.

Figure 4:
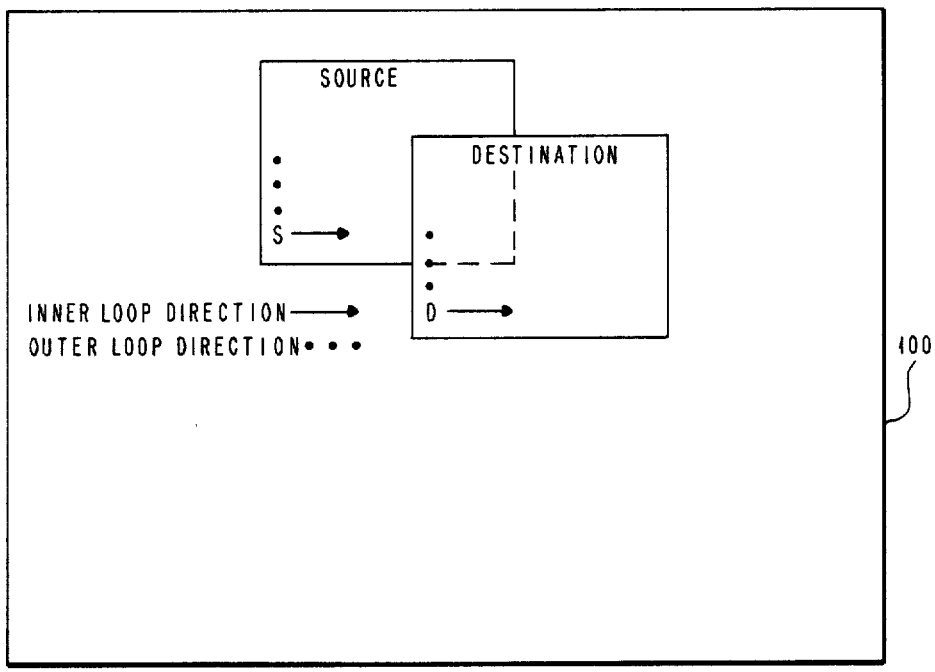
FIG. 4 illustrates the Merge or Copy Bit Block Transfer where the destination is physically below the source rectangle.

FIG. 4 illustrates the case where the destination rectangle is physically below the source rectangle. As in FIG. 3, the horizontal displacement between source and destination rectangles need not be considered. FIG. 4 illustrates the source and destination access is still horizontal but the toggle inc/dec functions 3 and 4 in FIG. 1 have been invoked for the outer loop update to the source and destination y-addresses. This has the effect of scanning the rectangle out from left to right in the inner loop and from bottom to top in the outer loop. As long as the vertical displacement in both FIG. 3 and FIG. 4 is not zero, the destination will be written without interfering with or "clobbering" the source data. The setup code that sets the control flags 3 and 4 is block 31 in FIG. 2. Steps 58 and 60 will execute as decrements due to the enabling of toggle inc/dec flags 3 and 4 FIG. 1 in the setup code 31 in FIG. 2.

Summarizing FIG. 4, the inner loop accesses the source rectangle in the horizontal direction and the inner loop increments the x-address. The inner loop accesses the destination rectangle in the horizontal direction and the inner loop increments the x-address. The outer loop decrements the source rectangle's y-address, and decrements the destination rectangle's y-address.

Figure 5:
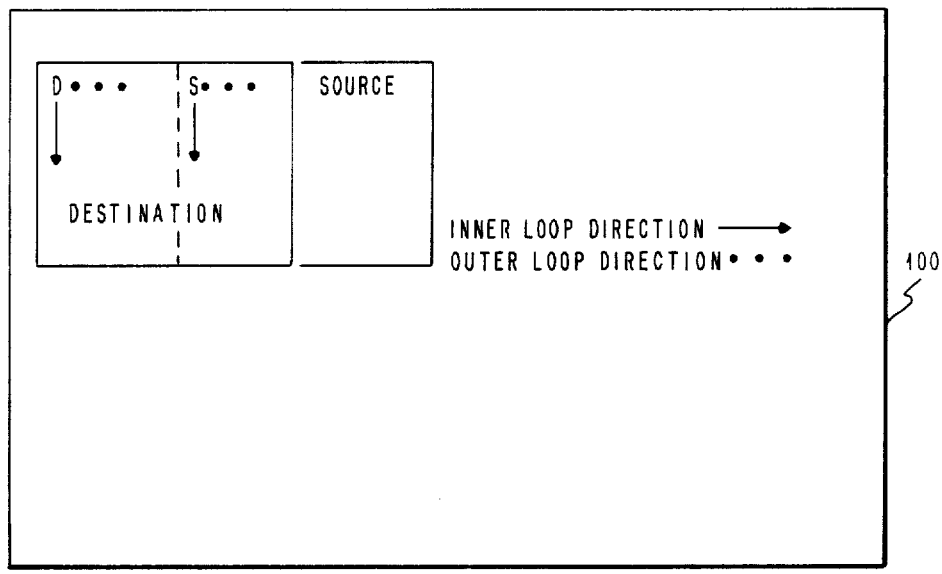
FIG. 5 illustrates the Merge or Copy Bit Block Transfer where the destination is physically to the left of the source rectangle.

FIG. 5 illustrates the case of a zero vertical displacement between source and destination but the destination rectangle is physically to the left of the source. Since the horizontal displacement may be any number of pels, the sure way to read the source and write the destination in the inner loop is vertically. This is accomplished when the setup code 32 sets the Vertical/Horizontal flag 6 in FIG. 1 to vertical mode. The source is read in the vertical direction in step 42. Step 44 has no effect since the toggle 90 degrees flag 5 was not set (enabled) by the setup code. Therefore the writing of the source takes place in the vertical mode and similarly step 48 has no effect on the direction of access. The inc/dec flags 3 and 4 in FIG. 1 are not set (enabled) by the setup code 32. The steps 58 and 60 execute as increments for the updates to the source and destination outer loop addresses. The rectangle is scanned out from top to bottom in the inner loop and then from left to right in the outer loop. The setup code that sets the control flag 6 is block 32 in FIG. 2.

Summarizing FIG. 5, the inner loop accesses the source rectangle in the vertical direction and the inner loop increments the y-address. The inner loop accesses the destination rectangle in the vertical direction and the inner loop increments the y-address. The outer loop increments the source rectangle's x-address, and increments the destination rectangle's x-address.

Figure 6:
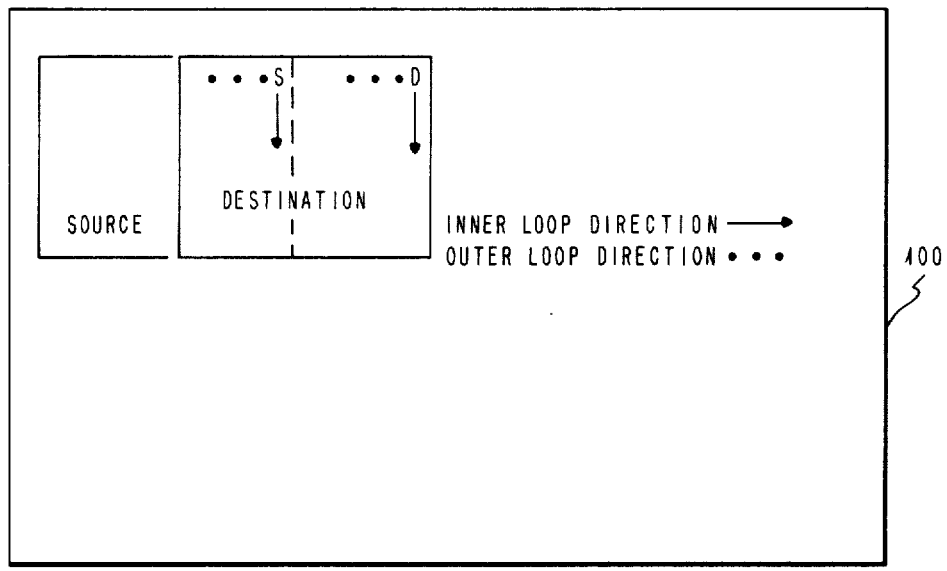
FIG. 6 illustrates the Merge or Copy Bit Block Transfer where the destination is physically to the right of the source rectangle.

FIG. 6 shows the case where there is zero vertical displacement between source and destination but the destination rectangle is physically to the right of the source. As in FIG. 5 the access is vertical so the vertical/horizontal flag 6 is set to the vertical mode. The difference between the case illustrated in FIGS. 5 and 6 is that FIG. 6 decrements the outer loop source and destination addresses. This is done by invoking the Toggle Inc/Dec functions through the toggle inc/dec flags 3 and 4 in FIG. 1. Consequently steps 58 and 60 are executed as decrements of the source and destination outer loop addresses. The rectangle is then scanned out top to bottom in the inner loop and from right to left in the outer loop. This case concludes the overlapping merge or copy Bit Block Transfer. The setup code that sets the flags 3, 4, and 6 is block 33 in FIG. 2.

Summarizing FIG. 6, the inner loop accesses the source rectangle in the vertical direction and the inner loop increments the y-address. The inner loop accesses the destination rectangle in the vertical direction and the inner loop increments the y-address. The outer loop decrements the source rectangle's x-address, and decrements the destination rectangle's x-address.

FIGS. 7 through 10 show the additional Bit Block Transfer functions. In these cases the source and destination rectangles must not overlap. A +90 degree rotation means the data is rotated in a clockwise direction by 90 degrees. A −90 degree rotation means the data is rotated in a counter-clockwise direction by 90 degrees.

Figure 7:
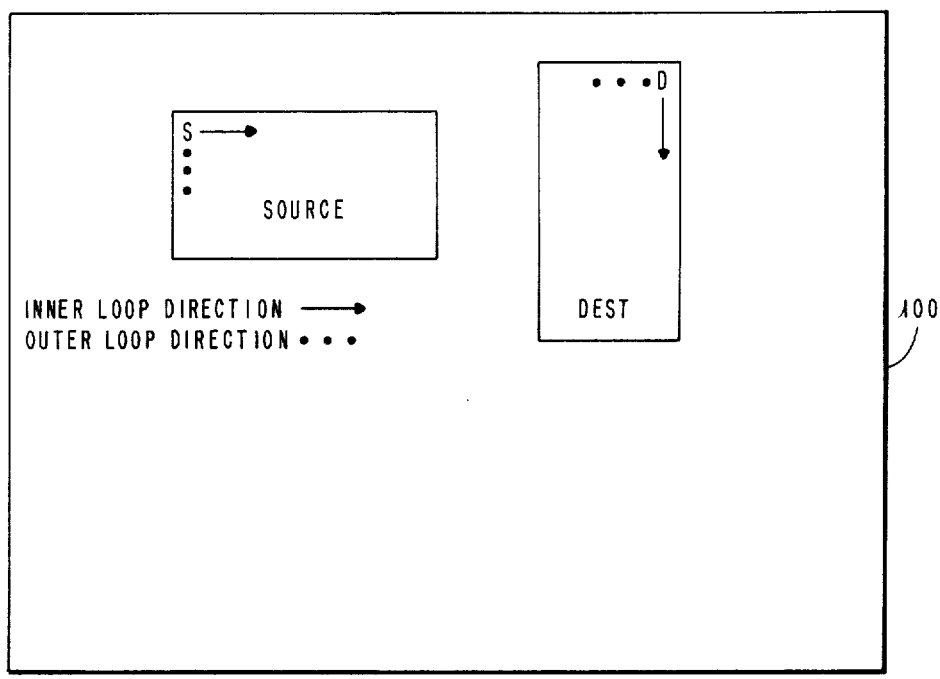
FIG. 7 illustrates the +90 degree Merge or Copy Bit Block Transfer.

FIG. 7 illustrates the rotation of destination data with respect to source data by +90 degrees. A setup routine 34 sets the toggle 90 degree flag 5 FIG. 1 to change the direction of access between reading the source data and writing the destination data. The setup code 34 keeps the default direction of memory access which is horizontal, but it does set the toggle 90 degrees flag 5. Step 42 reads the source in the horizontal direction. Then the direction of access is changed by 90 degrees in step 44 because the toggle 90 degrees flag 5 was set. The destination is therefore written in the vertical direction in step 46. Step 48 changes the direction by 90 degrees once again to the horizontal direction. The destination x-address is decremented by using the toggle inc/dec flag 4 in FIG. 1. Step 58 executes as the default increment of the source outer loop address, but step 60 executes as a decrement of the destination outer loop address. Therefore the source rectangle is scanned out horizontally by the inner loop and top to bottom by the outer loop. The destination rectangle is scanned out vertically in the inner loop and right to left in the outer loop. The effect is a +90 degree rotation of the data.

Summarizing FIG. 7, the inner loop accesses the source rectangle in the horizontal direction and the inner loop increments the x-address. The inner loop accesses the destination rectangle in the vertical direction and the inner loop increments the y-address. The outer loop increments the source rectangle's y-address, and decrements the destination rectangle's x-address.

Figure 8:
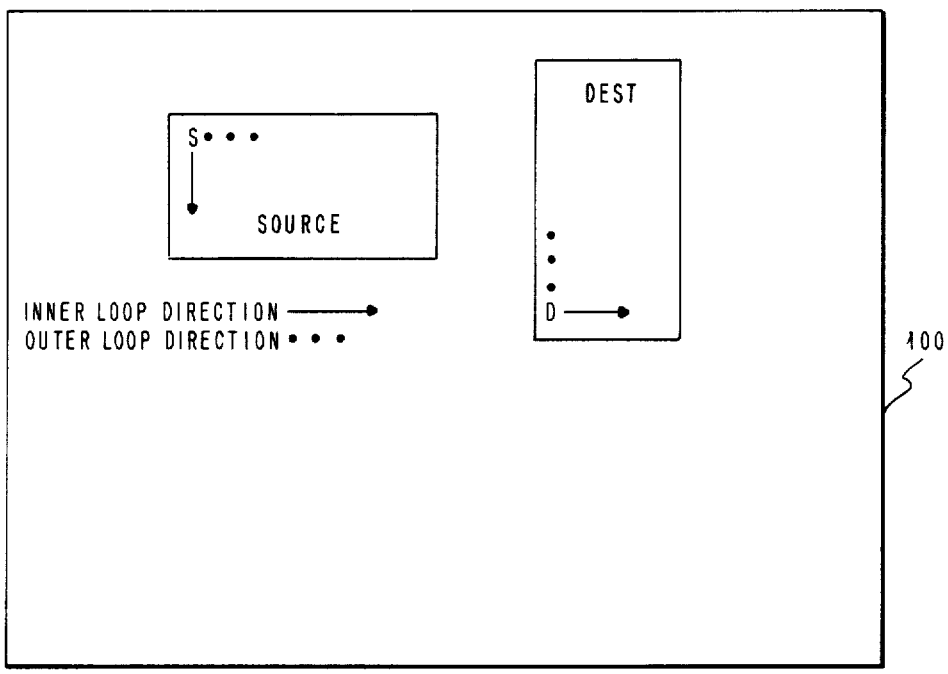
FIG. 8 illustrates the −90 degree Merge or Copy Bit Block Transfer.

FIG. 8 illustrates the rotation of destination data with respect to source data by −90 degrees. A setup routine 35 sets the vertical/horizontal direction flag 6 FIG. 1 to vertical, and sets the toggle 90 degree flag 5 FIG. 1 to change the direction of access between reading the source data and writing the destination data. Setting the vertical/horizontal flag 6 sets the direction of access to the vertical direction in the setup code. Step 42 thus reads the source data in the vertical direction. The toggle 90 degree flag 5 is set so step 44 will change the direction of access to the horizontal direction. Step 46 will write the destination data in the horizontal direction. The toggle 90 degrees flag 5 is still set so step 48 changes the direction of access back to vertical. The destination y-address is decremented by using the toggle inc/dec flag 4 in FIG. 1. Step 58 increments (default case) the source outer loop address while the toggle inc/dec flag 4 causes step 60 to decrement the destination outer loop address. Therefore the source rectangle is scanned out vertically by the inner loop and left to right by the outer loop. The destination rectangle is scanned out horizontally by the inner loop and from bottom to top by the outer loop. This results in a −90 degree rotation of the data.

Summarizing FIG. 8, the inner loop accesses the source rectangle in the vertical direction and the inner loop increments the y-address. The inner loop accesses the destination rectangle in the horizontal direction and the inner loop increments the x-address. The outer loop increments the source rectangle's x-address, and decrements the destination rectangle's y-address.

Figure 9:
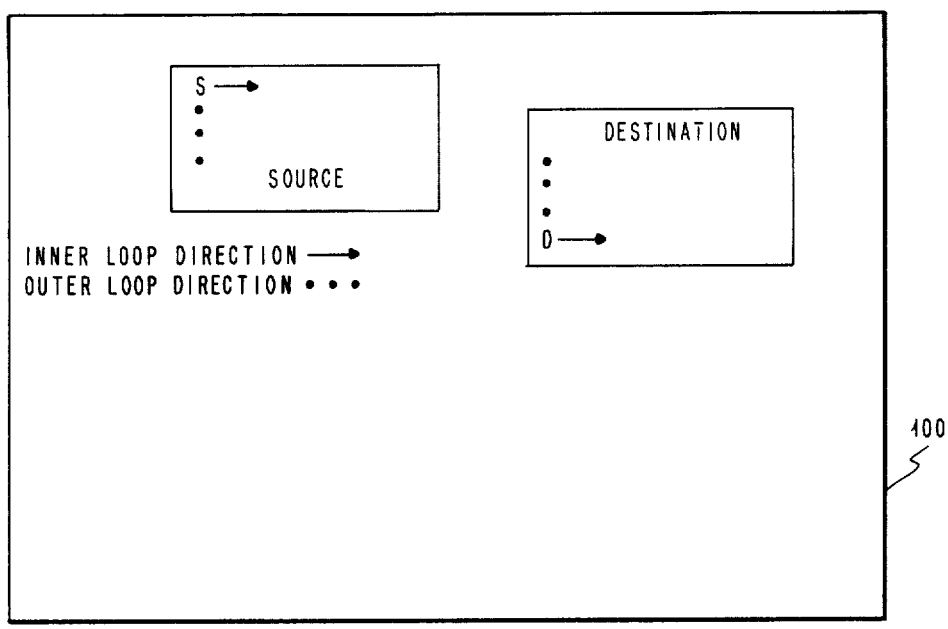
FIG. 9 illustrates the 180 degree X-axis symmetry Merge or Copy Bit Block Transfer.

FIG. 9 illustrates how the data can be copied to result in a 180 degree X-axis symmetry. The destination is an image of the source mirrored about the X-axis and merged with or copied to the destination. The access for both source and destination rectangles is horizontal. The setup code sets the toggle inc/dec flag 4 in FIG. 1 so that the destination y-address is decremented in step 60. The source is scanned out horizontally in the inner loop and from top to bottom by the outer loop. The destination is scanned out horizontally by the inner loop and from bottom to top by the outer loop. The setup code that sets the toggle inc/dec flag 4 is block 36 in FIG. 2.

Summarizing FIG. 9, the inner loop accesses the source rectangle in the horizontal direction and the inner loop increments the x-address. The inner loop accesses the destination rectangle in the horizontal direction and the inner loop increments the x-address. The outer loop increments the source rectangle's y-address, and decrements the destination rectangle's y-address.

Figure 10:
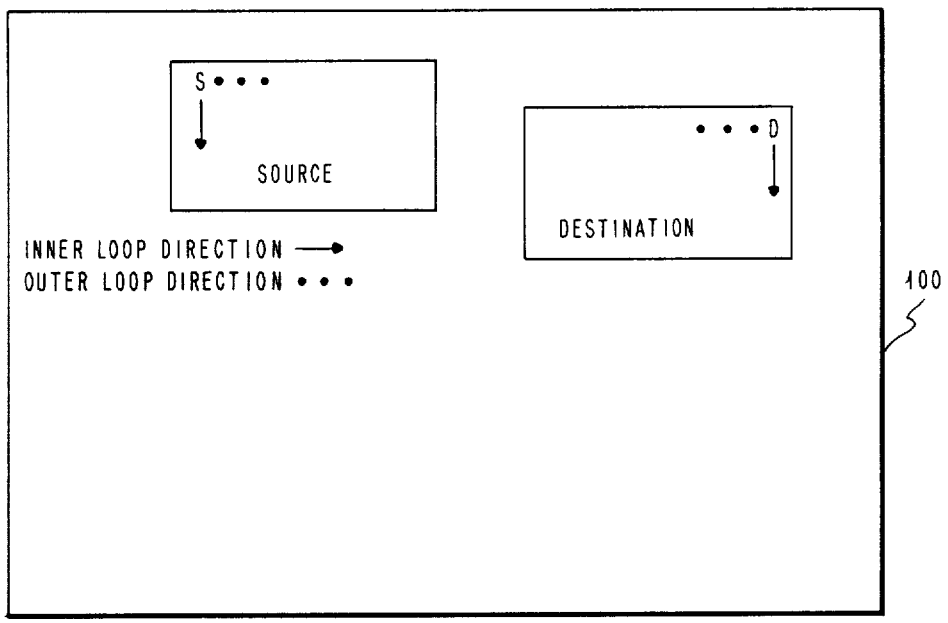
FIG. 10 illustrates the 180 degree Y-axis symmetry Merge or Copy Bit Block Transfer.

FIG. 10 illustrates how a 180 degree Y-axis symmetry Merge or Copy Bit Block Transfer can be accomplished. The vertical/horizontal flag 6 in FIG. 1 is set to vertical mode. The toggle inc/dec flag 4 in FIG. 1 is invoked for the destination x-address. The source rectangle is scanned out from top to bottom in the inner loop and from left to right in the outer loop. The destination rectangle is scanned out from top to bottom in the inner loop and from right to left in the outer loop. This results in the source data being mirrored 180 degrees about the Y-axis and merged with or copied to the destination. The setup code that sets the flags 6 and 4 is block 37 in FIG. 2.

Summarizing FIG. 10, the inner loop accesses the source rectangle in the vertical direction and the inner loop increments the y-address. The inner loop accesses the destination rectangle in the vertical direction and the inner loop increments the y-address. The outer loop increments the source rectangle's x-address, and decrements the destination rectangle's x-address.

Table II (FIG.12) is a summary table of the combination of directions of access for the source and destination rectangles and the use of the increment and decrement functions on the outer loop. The use of the special hardware features described above allows the Bit Block Transfer tasks to be broken down into a minimum of eight special cases. This not only saves code space but it saves execution time. Further savings in code space result by using the same inner and outer loop for all eight cases described. The total inner and outer loop code count was 23 instructions. The total setup instructions for FIGS. 3 through 6 was 29. The setup for the +90 degree rotation (FIG. 7) and the −90 degree rotation (FIG. 8) each took 4 instructions. The setup for the 180 degree X-axis symmetry (FIG. 9) and the 180 degree Y-axis symmetry (FIG. 10) took 2 instructions each. This brings the total code count to 64 (decimal) instructions. The parallelism of the horizontal microcode along with the specially architected hardware features provides a powerful rasterop engine ideally suited to Bit Block Transfer operations.

While this invention has been particularly shown and described with reference to a preferred embodiment thereof, it will be understood by those skilled in the art that the foregoing and other changes in form and detail may be made therein without departing from the spirit and scope of the invention.

We claim:

1. A memory circuit comprising:
   means for storing bit addressable binary data arranged in a plurality of dimensional directions;
   means for accessing a group of data in said storing means in at least two of said dimensional directions, said accessing means including means for selecting either incrementing or decrementing of a source address during the accessing of said data; and
   moving means for moving said group of data to a different dimensional location specified by a destination address while maintaining the data within the group.

2. A memory circuit according to claim 1 wherein said selecting means includes means for selecting incrementing or decrementing said address in either of said two dimensional directions.

3. A memory circuit according to claim 2 wherein said selecting menas includes a latch to store a value selecting the incrementing or decrementing of said address.

4. A memory circuit according to claim 3 wherein said accessing means includes means for reading data in said storing means in a first dimensional direction and said moving means includes means for writing said data in a second different dimensional direction.

5. A memory circuit according to claim 4 wherein said accessing means includes means for accessing a variable number of bits in a single access.

6. A memory circuit according to claim 5 wherein said accessing means and said moving means are connected to means for performing logical operations upon data stored in different locations in said storing means and in different dimensional directions.

7. A memory circuit according to claim 6 wherein said logical operations means includes means for accessing a first group of data as source data, a second group of data as destination data, and performing a logical operation upon the source and destination data and storing the resulting data at the address of the destination data.

8. A memory circuit according to claim 1 wherein said accessing means includes means for incrementally or decrementally addressing said data in at least one of said dimensional directions.

9. A memory circuit comprising:
   means for storing bit addressable binary data arranged in a plurality of dimensional directions;
   means for accessing a group of data in said storing means at a specified source address in at least two of said dimensional directions; and
   moving means for moving said data to a different dimensional location while maintaining the data within the group, said moving means including means for selecting either incrementing or decrementing of a destination address during the accessing of said data.

10. A memory circuit according to claim 9 wherein said selecting means includes means for selecting incrementing or decrementing said address in either of said two dimensional directions.

11. A memory cjrucit according to claim 10 wherein said selecting means includes a latch to store a value selecting the incrementing or decrementing of said address.

12. A memory circuit according to claim 11 wherein said accessing means includes means for reading data in said storing means in a first dimensional direction and said moving means includes means for writing said data in a second different dimensional direction.

13. A memory circuit according to claim 12 wherein said accessing means includes means for accessing a variable number of bits in a single access.

14. A memory circuit according to claim 13 wherein said accessing means and said moving means are connected to means for performing logical operations upon data stored in different locations in said storing means and in different dimensional directions.

15. A memory circuit according to claim 14 wherein said logical operations means includes means for accessing a first group of data as source data, a second group of data as destination data, and performing a logical operation upon the source and destination data and storing the resulting data at the address of the destination data.

* * * * *

UNITED STATES PATENT AND TRADEMARK OFFICE
CERTIFICATE OF CORRECTION

PATENT NO. : 4,763,251

DATED : August 9, 1988

INVENTOR(S) : A. A. Kauffman, jr., et al

It is certified that error appears in the above-identified patent and that said Letters Patent is hereby corrected as shown below:

Col. 10, line 30, delete "menas" and insert --means--.

Col. 11, line 6, delete "cirucit" and insert --circuit--.

Signed and Sealed this

Fifth Day of November, 1991

Attest:

HARRY F. MANBECK, JR.

*Attesting Officer*    *Commissioner of Patents and Trademarks*